United States Patent
Mayfield et al.

(10) Patent No.: US 8,899,609 B2
(45) Date of Patent: Dec. 2, 2014

(54) T-BAR MOUNTING SYSTEM FOR MOUNTING AN ACCESSORY TO A HITCH RECEIVER

(71) Applicant: GTM Products, LLC, Carthage, MO (US)

(72) Inventors: Tony Dean Mayfield, Sarcoxie, MO (US); Eugene Phillip Mayfield, Carthage, MO (US); Justin Lynn Porter, Carthage, MO (US)

(73) Assignee: Hildebradt International Incorporated, Santa Fe Springs, CA (US)

( * ) Notice: Subject to any disclaimer, the term of this patent is extended or adjusted under 35 U.S.C. 154(b) by 0 days.

(21) Appl. No.: 13/941,965

(22) Filed: Jul. 15, 2013

(65) Prior Publication Data
US 2014/0015237 A1 Jan. 16, 2014

Related U.S. Application Data

(60) Provisional application No. 61/741,190, filed on Jul. 16, 2012.

(51) Int. Cl.
*B60D 1/167* (2006.01)
*B60D 1/48* (2006.01)

(52) U.S. Cl.
CPC ....................................... *B60D 1/48* (2013.01)
USPC ..................... 280/494; 280/491.1; 280/495

(58) Field of Classification Search
CPC .............. B60D 1/54; B60D 1/18; B60D 1/52; B60D 1/167; B60D 1/155
USPC ................ 280/415.1, 482, 895, 491.4, 491.1, 280/491.2, 416.1, 406.2, 494, 477, 495, 280/491.5
See application file for complete search history.

(56) References Cited

U.S. PATENT DOCUMENTS

| | | | | | |
|---|---|---|---|---|---|
| 336,363 | A | * | 2/1886 | Ward | 248/515 |
| 2,386,195 | A | * | 10/1945 | Clark | 280/477 |
| 4,640,523 | A | * | 2/1987 | Wolmarans | 280/491.4 |
| 5,000,473 | A | * | 3/1991 | Johnson | 280/491.1 |
| 5,232,240 | A | * | 8/1993 | Johnson | 280/491.5 |
| 5,516,140 | A | * | 5/1996 | Hinte | 280/494 |
| 5,857,741 | A | * | 1/1999 | Anderson | 297/170 |
| 5,873,595 | A | * | 2/1999 | Hinte | 280/491.1 |
| 5,957,477 | A | * | 9/1999 | Ensz et al. | 280/482 |
| 6,085,954 | A | * | 7/2000 | Bloemer et al. | 224/509 |
| 6,168,182 | B1 | * | 1/2001 | Ford | 280/494 |
| 6,402,180 | B1 | * | 6/2002 | Mosdal et al. | 280/457 |
| 6,428,030 | B2 | * | 8/2002 | Melesko et al. | 280/477 |
| 6,511,088 | B2 | * | 1/2003 | Kahlstorf | 280/415.1 |
| 6,722,380 | B1 | * | 4/2004 | Hafer | 280/415.1 |
| 7,506,889 | B2 | * | 3/2009 | Baltrusaitis et al. | 280/502 |
| 7,818,439 | B2 | * | 10/2010 | Maeda et al. | 709/230 |

(Continued)

*Primary Examiner* — Hau Phan
(74) *Attorney, Agent, or Firm* — Martin & Associates, LLC; Bret J. Petersen

(57) ABSTRACT

An adjustable hitch receiver system provides multiple attachment points to adequately secure accessories such a pop-up canopy to an automobile. The mounting system includes a T-bar that connects to the hitch receiver with two adjustable arms. The adjustable arms of the hitch receiver system can be equipped with different attachment arms that are configured to attach to various accessories. The two adjustable arms can be used to secure two different accessories or secure a single accessory at two attachment points. In particular, a canopy attachment arm is configured to attach to a pop-up type canopy to securely and adjustably support the canopy.

20 Claims, 4 Drawing Sheets

(56) References Cited

U.S. PATENT DOCUMENTS

| | | | |
|---|---|---|---|
| 7,819,128 B2 | 10/2010 | Clark et al. | |
| 7,988,179 B1 * | 8/2011 | Goodman et al. | 280/491.4 |
| 8,128,116 B1 * | 3/2012 | Huston et al. | 280/493 |
| 2007/0001425 A1 * | 1/2007 | Helms et al. | 280/456.1 |

* cited by examiner

T-BAR MOUNTING SYSTEM FOR MOUNTING AN ACCESSORY TO A HITCH RECEIVER

BACKGROUND

1. Technical Field

This disclosure generally relates to receiver hitch accessories, and more specifically relates to a hitch receiver mounting system with a T-Bar to adjustably secure one or more accessories to a to a hitch receiver including a canopy.

2. Background Art

It has become a popular practice to attach accessories to a vehicle hitch receiver for outdoor activities such as "tailgating", camping, construction, swap meets, etc. There are several systems available for attaching accessories to a receiver hitch of a vehicle. These accessories include umbrellas, seating, grills, luggage racks and the like.

BRIEF SUMMARY

While the prior art systems provided for attachment of umbrellas to provide shade using a hitch receiver, the prior art systems do not provide an adjustable hitch receiver system that can provide multiple attach points to adequately secure accessories such a pop-up canopy. Described herein is an adjustable hitch receiver system that provides multiple attachment points to adequately secure accessories such a pop-up canopy to an automobile. The mounting system includes a T-bar that connects to the hitch receiver with two adjustable arms. The adjustable arms of the hitch receiver system can be equipped with different attachment arms that are configured to attach to various accessories. The two adjustable arms can be used to secure two different accessories or secure a single accessory at two attachment points. In particular, a canopy attachment arm is configured to attach to a pop-up type canopy to securely and adjustably support the canopy. Another adjustable arm is described to allow the T-bar mounting system to secure two umbrellas to the automobile hitch receiver.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Described herein is an adjustable hitch receiver system that provides multiple attachment points to adequately secure accessories such as a pop-up canopy to an automobile. The mounting system includes a T-bar that connects to the hitch receiver with two adjustable arms. The adjustable arms of the hitch receiver system can be equipped with different attachment arms that are configured to attach to various accessories. The two adjustable arms can be used to secure two different accessories or secure a single accessory at two attachment points. In particular, a canopy attachment arm is configured to attach to a pop-up type canopy to securely and adjustably support the canopy.

Figure 1:
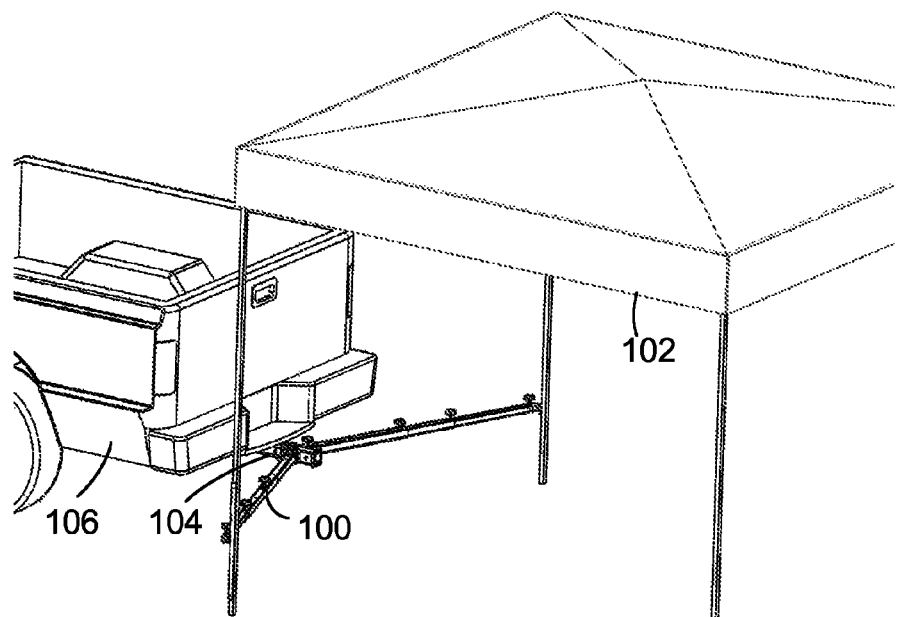
FIG. 1 illustrates a perspective view of a T-bar mounting system attached to a hitch receiver of a automobile to support a pop-up type canopy.

FIG. 1 illustrates an adjustable T-bar mounting system 100 that provides multiple attachment points to adequately secure accessories such a pop-up canopy 102 to a hitch receiver 104 on an automobile 106. The T-bar mounting system 100 fits into a conventional hitch receiver 104 as known in the prior art. The most common hitch receiver 104 is 2 inches square but the T-bar mounting system could be configured for any hitch receiver size. The T-bar mounting system 100 is adjustable to allow the user to position the pop-up canopy 102 to some distance behind the automobile 106, or next to the automobile. The T-bar mounting system provides an additional hitch receiver opening to accept a hitch receiver accessory as described further below. An accessory such as a grill or table could be inserted into the additional receiver opening in the T-bar mounting system such that the grill or table (not shown) would be under the shade provided by the pop-up canopy 102.

Figure 2:
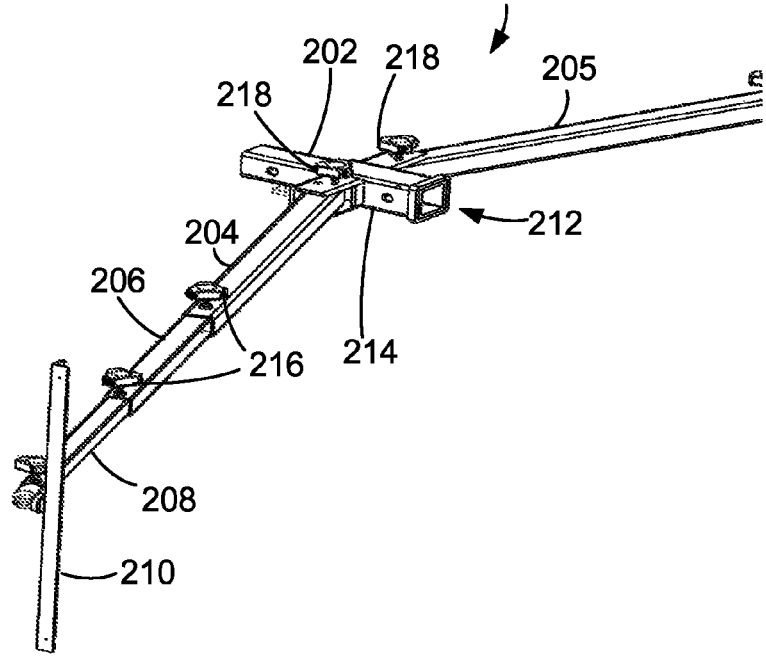
FIG. 2 illustrates a perspective view of a T-bar mounting system.

FIG. 2 illustrates a perspective view of an example of a T-bar mounting system 100 as described and claimed herein. The example T-bar mounting system 100 in FIG. 2 includes a T-bar 202 that fits into the hitch receiver of the automobile as shown in FIG. 1. FIG. 2 illustrates the left portion of the T-Bar mounting system. On the left side of the T-bar 202 there is an adjustable arm 204, an extension arm 206, and an attachment arm 208. The other side of the T-bar preferably includes the same 3 components. The adjustable arm 205 is illustrated here but the extension arm and attachment arm for the right portion are not shown in FIG. 2. The T-bar 202 fits into the hitch receiver 104 of an automobile as shown in FIG. 1 and provides an additional hitch receiver opening 212 to accept a hitch receiver accessory (not shown) as described above. The adjustable arms 204, 205 are pivotally attached to the T-bar 202 to adjust the angle between the adjustment arms 204, 205 and a receiver section 214 of the T-bar 202. The adjustable arm 204 is connected to the extension arm 206 and the extension arm 206 is connected to the accessory arm 208. The accessory arm includes attachment means to hold an accessory. In FIG. 2, the accessory arm 208 includes an angle bracket 210 that connects to a canopy or other accessory that has a square pole. The accessory arm 208 is described further below.

Again referring to FIG. 2, the connections of the adjustable arm 204 and the accessory arm allow the user to adjust T-bar mounting system 100 to accommodate different sizes of accessories such as the canopy shown in FIG. 1. These connections can also be used to adjust the desired position of the accessories attached to the attachment arms relative to the automobile. The adjustment arm 204, the extension arm 206 and the accessory arm 210 are preferably connected in a telescoping fashion with the adjustment arm 204 and the accessory arm 208 sliding inside the extension arm 206. Alternatively, the accessory arms can be telescoping within the adjustable arms without using an extension arm. In this example, the telescoping sections are secured in the desired location with hand screws 216 that are threaded into the top section of the telescoping section and impinge on the inside telescoping section to hold it from moving. Similarly the adjustable arms 204, 205 of the T-Bar 202 can be held in place with hand screws 218 to keep them at the selected angle.

Figure 3:
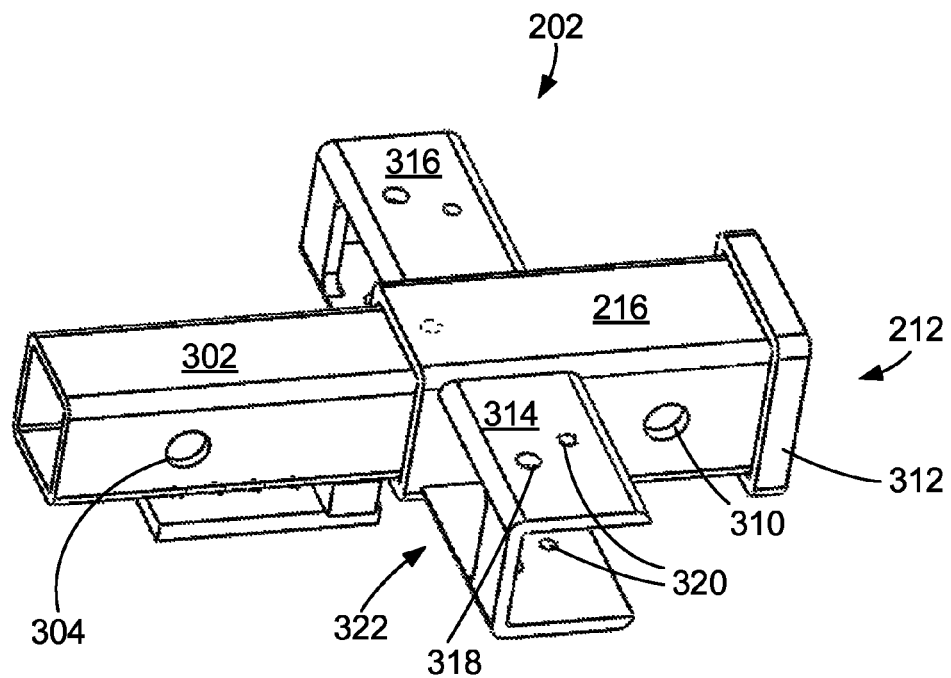
FIG. 3 illustrates a perspective view of a T-bar component of the T-bar mounting system.

FIG. 3 illustrates a perspective view of the T-bar 202 of the T-bar mounting system 100 as introduced in FIG. 2. The T-bar 202 includes a receiver hitch tube 302 that inserts into a hitch receiver (104 in FIG. 1) in the conventional manner and secured with a pin (not shown) through the opening 304. The T-bar 202 further includes a receiver section 216 that provides an additional hitch receiver opening 212 to accept a hitch receiver accessory such as a grill or table (not shown) as described above. The receiver section 216 includes a hole 310 for securing the hitch receiver accessory with a pin in the conventional manner. The receiver section 216 may also include a reinforcement ring 312.

Again referring to FIG. 3, the T-bar 202 further includes two pivot brackets 314, 316. In FIG. 3 the left pivot bracket 314 is more clearly visible and illustrates additional preferred detail of the pivot brackets. The pivot bracket is preferably constructed of square tubing and welded to the side of the receiver section 216. The pivot bracket 314 is open at least partially on the front side to accommodate movement of the adjustable arm 204 as shown in FIG. 2. The pivot bracket 314 includes holes 318 for a pin or bolt to attach the adjustable arm 204. The holes 320 are provided to accommodate locking bolts or hand screws (218 described above) to hold the adjustable arm in the desired position. The pivot bracket 316 has similar features as pivot bracket 314. The pivot brackets 314, 316 preferably also include opening 322 in the back side of the brackets to allow the pivot arms to move into a stowed position as described further below.

Figure 4:
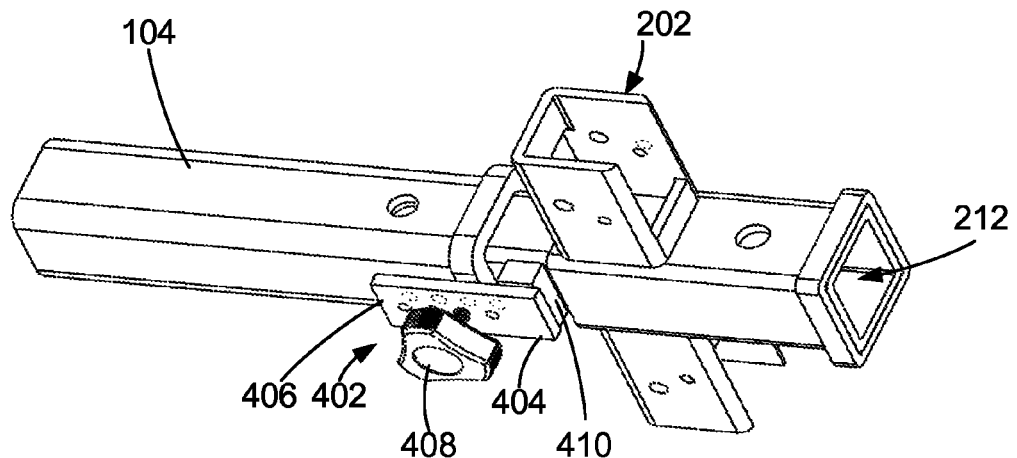
FIG. 4 illustrates a bottom view of the T-bar component to illustrate the stabilizer clamping mechanism of the T-bar mounting system.

FIG. 4 illustrates another view of the T-bar 202 of the T-bar mounting system 100 to illustrate a stabilizer clamping mechanism 402 for the T-bar mounting system. The stabilizer clamping mechanism 402 includes a stabilizer bar 404 that extends to overlap the hitch receiver when the T-Bar mounting system is attached to an automobile. The stabilizer bar 404 has one or more threaded holes 406 for a bolt or hand screw 408 to tighten the T-Bar 202 to the hitch receiver. The stabilizer bar is preferably attached to the T-Bar 202 with an offset block 410 to maintain a clearance for the hitch receiver. FIG. 4 further illustrates the T-bar 202 connected to the receiver 104. The receiver 104 is a portion of the receiver hitch that is normally mounted to the automobile but is show in this view to illustrate how the T-Bar 202 connects with the receiver 104 in connection with the stabilizer clamping mechanism 402. When the hand screw 408 is tightened, the T-bar mounting system is secured inside the receiver 104 to illuminate or reduce movement and vibration that may be caused by wind or other movement against the accessory or automobile.

Figure 5:
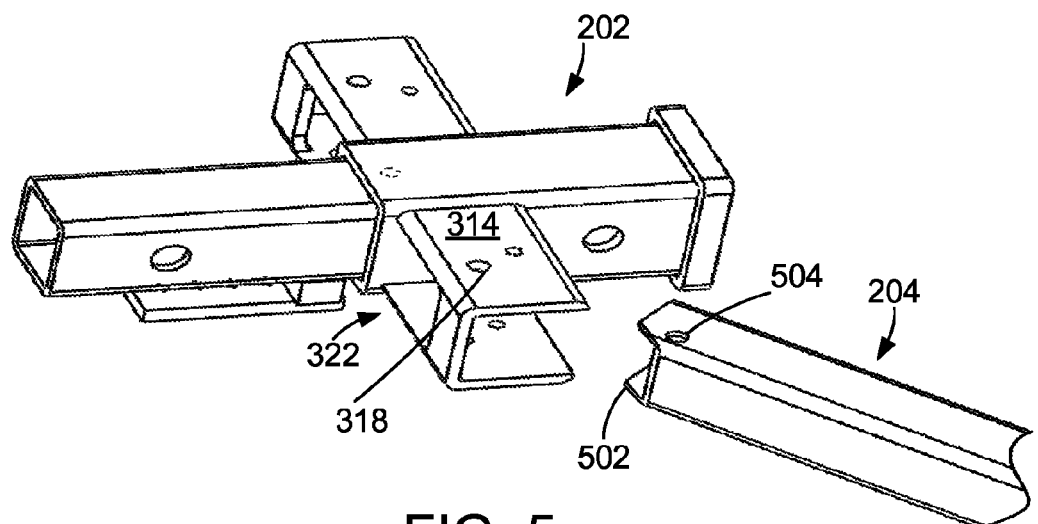
FIG. 5 illustrates an adjustable arm that connects to the T-bar in the T-bar mounting system.

FIG. 5 illustrates additional detail of the adjustable arm 204 of the T-bar mounting system 100 introduced in FIG. 2. The adjustable arm 204 is preferably a square metal tube with a chamfered edge 502 to allow the adjustable arm to pivot inside the pivot bracket 314 shown in FIG. 3. The adjustable arm 502 pivots inside the pivot bracket 314 about a bolt or pin (not shown) passing through the holes 504 (only the top hole is visible) in the adjustable arm 204 and the holes 318 in the pivot bracket 314.

Figure 6:
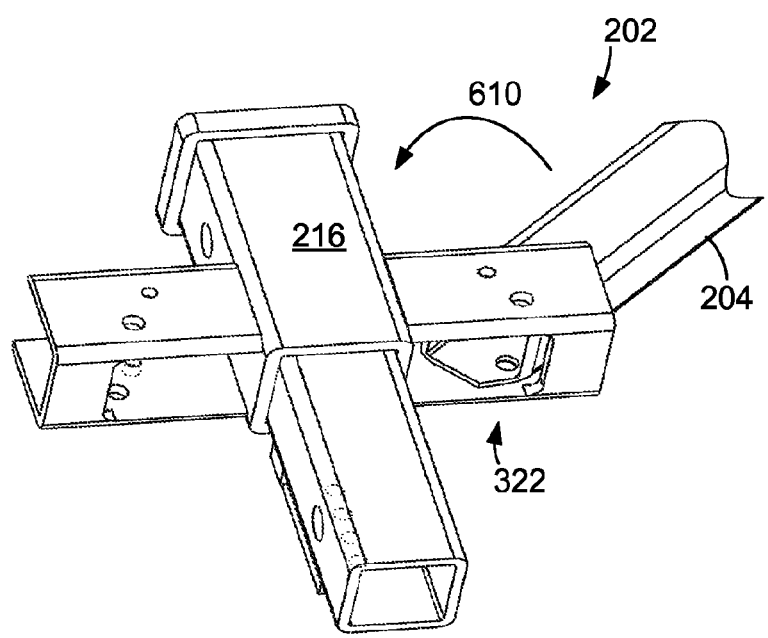
FIG. 6 illustrates the adjustable arm connecting to the T-bar in the T-bar mounting system.

FIG. 6 illustrates a perspective view of the adjustable arm 204 connected to the T-bar 202. In this illustration, the adjustable arm 204 is shown moving to a storage position in the T-bar 202. As described above, the adjustable arm 204 is able to pivot (arrow 610) so that it will be parallel with the receiver section 216 of the T-bar 202. Clearance for the end of the rotating adjustable arm 204 is provided by the opening 322 when the adjustable arm is moved to be parallel to the receiver section 216. This allows the adjustable arms to be more compact when removed from the automobile and stored or shipped.

Figure 7:
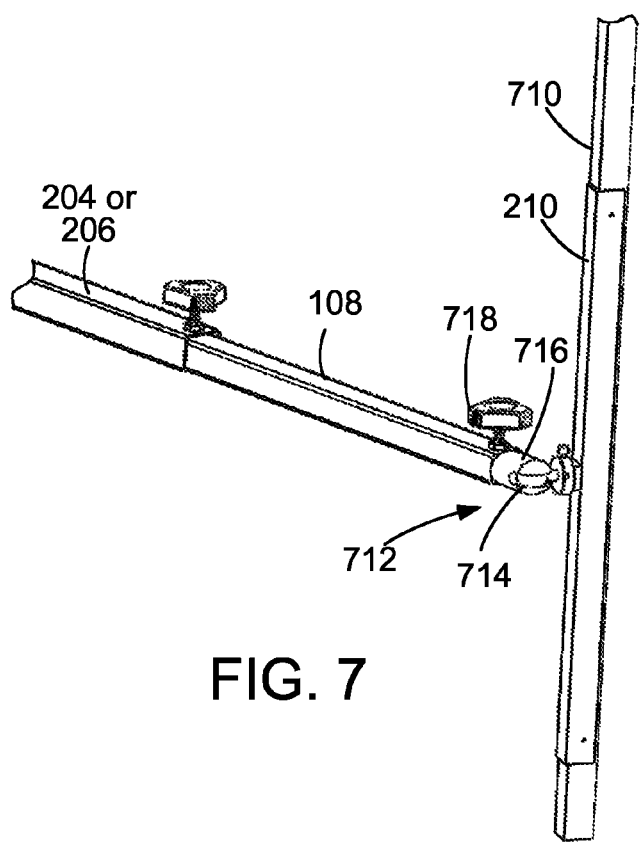
FIG. 7 illustrates an attachment arm with an adjustable angle clamp for the T-bar mounting system.

FIG. 7 illustrates an accessory arm 108 with an adjustable angle clamp 712 for the T-bar mounting system 100 described herein. The accessory arm 108 telescopically connects with the adjustable arm 204 or the extension arm 206 as described above. In this example, the accessory arm 108 includes an angle bracket 210 that connects to an accessory pole 710. The accessory pole 710 may be a leg of a pop-up canopy 102 as shown in FIG. 1. Preferably, the accessory arm 108 has an adjustable connection 712 to the angle bracket 210 to adjustable connect the adjustment arm to the accessory or pop-up canopy. In this example, the adjustable connection 712 is a swivel mount 714 attached to the angle bracket 712. The swivel mount 714 in this example has a cylinder shaped section 716 that fits inside the square tube of the accessory arm 108 and is secured by a hand screw 718.

Figure 8:
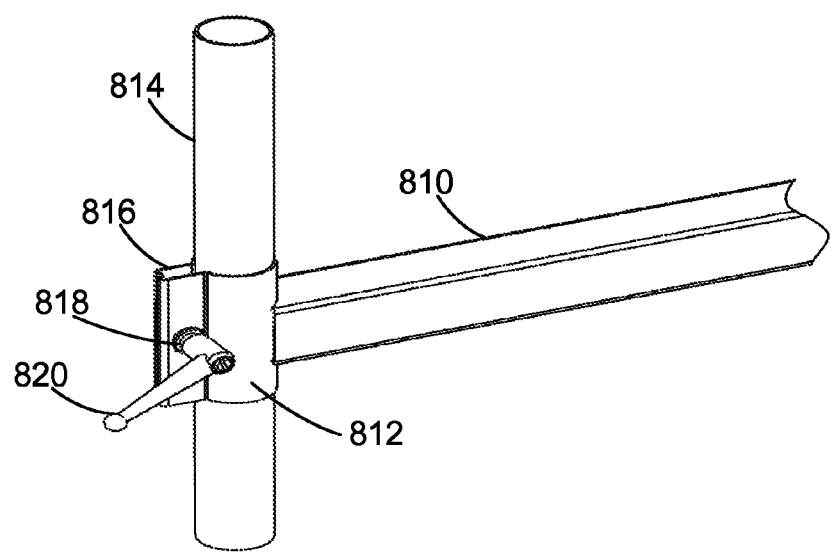
FIG. 8 illustrates an attachment arm with an umbrella C-clamp for the T-bar mounting system.

FIG. 8 illustrates an accessory arm 810 with a c-clamp 812 for the T-bar mounting system described herein. The accessory arm 810 could be used in place of the accessory arm 108 described in the previous paragraph when the accessory to be attached has a round pole 814 as shown. The accessory arm 810 fits into the adjustable arm 204 or the extension arm 206 (not shown) as described above. The C-clamp 812 is preferably a "C" shaped piece of metal welded at one side to the accessory arm 810. The "C" shaped piece of metal is preferably a length of pipe open along the length to form the shape of a "C" when viewed from the end of the pipe. On the opposite side of the weld to the accessory arm 810, the c-clamp 812 has extensions 816 with one or more bolts 818. In this example, the bolt 818 is tightened with a knob 820. When the bolt 818 is tightened, the extensions are compressed together, which reduces the diameter of the c-clamp 812 and tightens the pole 814 in the c-clamp to secure the accessory to the T-bar mounting system.

As described herein, a hitch receiver mounting system provides multiple, adjustable mounting points for hitch receiver accessories. The mounting system includes a T-bar that connects to the hitch receiver with adjustable arms to connect to multiple accessories or legs of a pop-up canopy. The adjustable arms of the hitch receive system are equipped with different attachment arms that are configured to attached to various accessories. A pop-up canopy attachment arm connected to the pop-up canopy allows the placement of the canopy to be adjusted relative to the automobile.

One skilled in the art will appreciate that many variations are possible within the scope of the claims. While the examples herein are described in terms of time, these other types of thresholds are expressly intended to be included within the scope of the claims. Thus, while the disclosure is particularly shown and described above, it will be understood by those skilled in the art that these and other changes in form and details may be made therein without departing from the spirit and scope of the claims.

The invention claimed is:

1. A hitch receiver mounting system comprising:
    a T-bar with a first end and a second end, the first end for connecting to a receiver of a receiver hitch of a vehicle, the second end comprising a receiver tube connected directly to the first end and capable of receiving a hitch accessory, and first and second pivot brackets mounted on opposite sides of the receiver tube;

a first adjustable arm adjustably connected to the first pivot bracket and a second adjustable arm adjustably connected to the second pivot bracket;

a first attachment arm connected to the first adjustable arm and a second attachment arm connected to the second adjustable arm;

wherein the adjustable arms move to adjust an angle between the adjustable arms and the receiver tube;

wherein the first and second attachment arms can be adjustably connected to two accessory points of at least one accessory; and wherein the receiver tube is capable of receiving the hitch accessory while the first and second attachment arms are connected to accessory points of the at least one accessory.

2. The apparatus of claim 1, wherein the two accessory points are two adjacent legs of a canopy.

3. The apparatus of claim 1 wherein the two accessory points are two poles of two adjacent accessories such two as umbrellas.

4. The apparatus of claim 1 further comprising a stabilizer clamping mechanism comprising a stabilizer bar connected to the T-bar, wherein the stabilizer bar extends over the receiver of a receiver hitch and has a bolt that tightens against the receiver and reduces movement of the T-bar.

5. The apparatus of claim 4 wherein the attachment arm is telescopically connected to the adjustable arm to allow the attachment arm to telescope in length to adjust the overall length of the attachment arm combined with the adjustment arm.

6. The apparatus of claim 5 further comprising an extension arm telescopically connected between the adjustable arm and the attachment arm to extend the attachment arm from the adjustable arm.

7. The apparatus of claim 1 wherein the attachment arm includes an angle bracket to connect to a square tubular pole of an accessory.

8. The apparatus of claim 7 wherein the attachment arm further comprises a swivel mechanism to connect the attachment arm to the angle bracket.

9. The apparatus of claim 1 wherein the attachment arm includes a C-clamp to connect to a cylindrical pole of an accessory.

10. The apparatus of claim 9 wherein the C-clamp is a "C" shaped section of open pipe attached to the attachment arm and includes extensions along the open portion of the pipe that are pressed together with at least one bolt in order to tighten around a pole of an accessory.

11. The apparatus of claim 1 wherein the first and second pivot brackets have an opening to allow the adjustable arm to be placed substantially parallel to the T-bar for storage.

12. A hitch receiver mounting system comprising:

a T-bar with a first end and a second end, the first end for connecting to a receiver of a receiver hitch of a vehicle, the second end comprising a receiver tube connected directly to the first end and capable of receiving a hitch accessory, and first and second pivot bracket mounted on opposite sides of the receiver tube;

a first adjustable arm adjustably connected to the first pivot bracket and second adjustable arm adjustably connected to the second pivot bracket;

a first attachment arm telescopically connected to the first adjustable arm and a second attachment arm telescopically connected to the second adjustable arm to allow the attachment arms to telescope in length to adjust the overall length of the attachment arms combined with the adjustment arms;

wherein the adjustable arms move to adjust an angle between the adjustable arms and the receiver tube;

wherein the first and second attachment arms can be adjustably connected to accessory points of at least one accessory;

wherein the receiver tube is capable of receiving the hitch accessory while the first and second attachment arms are connected to the accessory points of the at least one accessory; and wherein the first and second pivot brackets allow the adjustable arm to be placed substantially parallel to the T-bar for storage.

13. The apparatus of claim 12, wherein the accessory points are two adjacent legs of a canopy.

14. The apparatus of claim 12 further comprising a stabilizer clamping mechanism comprising a stabilizer bar connected to the T-bar, wherein the stabilizer bar extends over the receiver of a receiver hitch and has a bolt that tightens against the receiver and reduces movement of the T-bar.

15. The apparatus of claim 12 further comprising an extension arm telescopically connected between the adjustable arm and the attachment arm to extend the attachment arm from the adjustable arm.

16. The apparatus of claim 12 wherein the attachment arm includes an angle bracket to connect to a square tubular pole of an accessory.

17. The apparatus of claim 12 wherein the attachment arm further comprises a swivel mechanism to connect the attachment arm to the angle bracket.

18. The apparatus of claim 12 wherein the attachment arm includes a C-clamp to connect to a cylindrical pole of an accessory.

19. The apparatus of claim 12 wherein the C-clamp is a "C" shaped section of open pipe attached to the attachment arm and includes extensions along the open portion of the pipe that are pressed together with at least one bolt in order to tighten around a pole of an accessory.

20. A hitch receiver mounting system comprising:

a T-bar with a first end and a second end, the first end for connecting to a receiver of a receiver hitch of a vehicle, the second end comprising a receiver tube connected directly to the first end and capable of receiving a hitch accessory, and first and second pivot bracket mounted on opposite sides of the receiver tube;

a first adjustable arm adjustably connected to the first pivot bracket and second adjustable arm adjustably connected to the second pivot bracket; and a first attachment arm telescopically connected to the first adjustable arm and a second attachment arm telescopically connected to the second adjustable arm to allow the attachment arms to telescope in length to adjust the overall length of the attachment arms combined with the adjustment arms;

a stabilizer clamping mechanism comprising a stabilizer bar connected to the T-bar, wherein the stabilizer bar extends over the receiver of a receiver hitch and has a bolt that tightens against the receiver and reduces movement of the T-bar;

wherein the adjustable arms move to adjust an angle between the adjustable arms and the receiver tube;

wherein the first and second attachment arms can be adjustably connected to accessory points of at least one accessory;

wherein the receiver tube is capable of receiving the hitch accessory while the first and second attachment arms are connected to the accessory points of the at least one accessory;

wherein the accessory points are two adjacent legs of a pop-up type canopy;

wherein the attachment arm includes an angle bracket to connect to a square tubular pole of an accessory; and wherein the first and second pivot brackets have an opening to allow the adjustable arm to be placed substantially parallel to the T-bar for storage.

* * * * *